US006430738B1

(12) United States Patent
Gross et al.

(10) Patent No.: US 6,430,738 B1
(45) Date of Patent: Aug. 6, 2002

(54) METHOD AND SYSTEM FOR REVERSIBLE INSTALLATION OF SOFTWARE APPLICATIONS IN A DATA PROCESSING SYSTEM UTILIZING AN AUTOMATED ARCHIVAL PROCESS

(75) Inventors: Andrew Louis Gross; Mark Edward Hill; Gerald Damian John; Charley David Lillard; Douglas Eugene Torrens, all of Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/087,824

(22) Filed: Jul. 1, 1993

(51) Int. Cl.$^7$ ................................................ G06F 9/00
(52) U.S. Cl. ...................................................... 717/11
(58) Field of Search ............................ 395/700; 717/11

(56) References Cited

U.S. PATENT DOCUMENTS

| | | | |
|---|---|---|---|
| 5,008,814 A | | 4/1991 | Mathur ........................ 709/221 |
| 5,089,958 A | | 2/1992 | Horton et al. .................. 714/5 |
| 5,247,683 A | * | 9/1993 | Holmes et al. ............. 709/221 |
| 5,257,379 A | * | 10/1993 | Cwiakala ........................ 713/1 |
| 5,276,865 A | * | 1/1994 | Thorpe .......................... 714/24 |
| 5,327,531 A | * | 7/1994 | Bealkowski .................... 714/3 |
| 5,327,553 A | * | 7/1994 | Jewett et al. ................... 714/3 |
| 5,339,430 A | * | 8/1994 | Lundin et al. .............. 709/332 |
| 5,355,489 A | * | 10/1994 | Bealkowski .................... 713/2 |
| 5,367,686 A | * | 11/1994 | Fisher .......................... 717/11 |

OTHER PUBLICATIONS

"Microsoft Getting Started User Manual", Microsoft Corp. MS–DOS Ver 5.0, Microsoft 1991.*

* cited by examiner

*Primary Examiner*—St.-John Courtenay, III
(74) *Attorney, Agent, or Firm*—Robert M. Sullivan; Bracewell & Patterson, L.L.P.

(57) ABSTRACT

A method and system for permitting reversible installation of software applications in a data processing system which includes a processor, memory containing a first version of a selected software application and a storage system for receiving a removable storage medium. A removable storage medium which includes at least one alternate version of a selected software application is inserted into the storage system and a user is then prompted to select an alternate version of the selected software application for installation within the data processing system. The existing version of the selected software application within the data processing system is then automatically copied from memory to the removable storage medium prior to initiation of installation of the alternate version of the selected software application in response to a selection of the alternate version, such that the installation may be selectively reversed. A directory within the removable storage medium is automatically created and updated each time an application is copied from or to the removable storage medium with a listing of each alternate version of the selected software application, a required hardware level for utilization with each version of the selected software application and a listing of each data processing system within the enterprise which has utilized that version.

10 Claims, 3 Drawing Sheets

| MICROCODE REPLACEMENT DIRECTORY ||||||||
|---|---|---|---|---|---|---|---|
| OFFSET TO NEXT ENTRY | ENGINEERING CHANGE LEVEL | MIN HARDWARE LEVEL | MAX HARDWARE LEVEL | LOCATION ON TAPE | LENGTH | NUMBER OF DRIVES | DRIVE LIST |
| BYTE X | LEVEL 1B | 0 | 1 | BLOCK #1 | 1MB | 2 | DRIVE A DRIVE B |
| BYTE Y | LEVEL 2D | 0 | 1 | BLOCK #4 | 1MB | 3 | DRIVE A DRIVE C DRIVE G |
| BYTE Z | LEVEL 5L | 0 | 3 | BLOCK #8 | 1MB | 1 | DRIVE L |

40
42  44  46  48  50  52  54  56

MICROCODE REPLACEMENT DIRECTORY ~40

| OFFSET TO NEXT ENTRY | ENGINEERING CHANGE LEVEL | MIN HARDWARE LEVEL | MAX HARDWARE LEVEL | LOCATION ON TAPE | LENGTH | NUMBER OF DRIVES | DRIVE LIST |
|---|---|---|---|---|---|---|---|
| BYTE X | LEVEL 1B | 0 | 1 | BLOCK #1 | 1MB | 2 | DRIVE A<br>DRIVE B |
| BYTE Y | LEVEL 2D | 0 | 1 | BLOCK #4 | 1MB | 3 | DRIVE A<br>DRIVE C<br>DRIVE G |
| BYTE Z | LEVEL 5L | 0 | 3 | BLOCK #8 | 1MB | 1 | DRIVE L |
| ~42 | ~44 | ~46 | ~48 | ~50 | ~52 | ~54 | ~56 |

*Fig. 2*

METHOD AND SYSTEM FOR REVERSIBLE INSTALLATION OF SOFTWARE APPLICATIONS IN A DATA PROCESSING SYSTEM UTILIZING AN AUTOMATED ARCHIVAL PROCESS

BACKGROUND OF THE INVENTION

1. Technical Field

The present invention relates in general to improved data processing systems and in particular to a method and system for reversible installation of software applications within a data processing system. Still more particularly, the present invention relates to a method and system for reversible installation of software applications within a data processing system utilizing an automated archival process.

2. Description of the Related Art

The modern data processing system may encompass a wide variety of actual hardware devices. For example, data processing systems include large so-called "mainframe" computers, as well as individual digital pocket assistants which a user may hold comfortably in one hand. While such systems represent a remarkable development in the electronic art, these devices are relatively useless without sophisticated software applications which control the operation of these systems. By software application what is meant is the software or firmware which is utilized to control a task operation or system within a data processing system including, but not limited to: microcode; operating systems; and, high level software applications, such as database applications, word processing applications, and other such sophisticated applications.

The ubiquitous nature of data processing systems and the rapidity with which such systems are developed and enhanced has resulted in an ever increasing need to upgrade, update, and alter the software applications utilized in such machines. In an effort to increase the user friendliness of this operation, software installation packages have been developed which substantially automate this process. For example, software installation applications exist which automatically determine the capacity and capability of the data processing system hardware configuration for utilization with a particular software application. Additionally, enhanced versions of software applications are often installed within a data processing system which utilizes a preceding version of that application, without requiring the removal of the preceding application. Such "upgrades" of software applications may be typically accomplished in a highly automated and user friendly manner; however, an inherent danger in such automation is the problem that the updated or enhanced software application may not function properly in relation to other applications within the system, despite the apparent capacity of the hardware configuration to operate utilizing the enhanced application. Having upgraded the software application by enhancing an existing version of that application, the user of such a data processing system is not in a position to reverse such an installation without having previously copied or created a so-called "back-up" of the current software application.

Additionally, the proliferation of data processing systems may often result in an inconsistent level of software installation within multiple similar systems located within a single enterprise. In such cases, confusion often results as a result of an assumed capability of a particular data processing system which is based upon previous experience with a similar data processing system located within the same enterprise.

In view of the above, it should be apparent that a need exists for a method and system whereby the automated installation of software applications may be accomplished in a manner which is selectively reversible, without requiring the user to create a backup copy of each software application prior to such installation. Further, a system for maintaining and cataloging various software application versions within multiple data processing systems located within a single enterprise would also be highly useful.

SUMMARY OF THE INVENTION

It is therefore one object of the present invention to provide an improved data processing system.

It is another object of the present invention to provide an improved method and system for reversible installation of software applications within a data processing system.

It is yet another object of the present invention to provide an improved method and system for reversible installation of software applications within a data processing system utilizing an automated archival process.

The foregoing objects are achieved as is now described. The method and system of the present invention permits reversible installation of software applications in a data processing system which includes a processor, memory containing a first version of a selected software application and a storage system for receiving a removable storage medium. A removable storage medium which includes at least one alternate version of a selected software application is inserted into the storage system and a user is then prompted to select an alternate version of the selected software application for installation within the data processing system. The existing version of the selected software application within the data processing system is then automatically copied from memory to the removable storage medium prior to initiation of installation of the alternate version of the selected software application in response to a selection of the alternate version, such that the installation may be selectively reversed. A directory within the removable storage medium is automatically created and updated each time an application is copied from or to the removable storage medium with a listing of each alternate version of the selected software application, a required hardware level for utilization with each version of the selected software application and a listing of each data processing system within the enterprise which has utilized that version.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 2 is a pictorial representation of a directory entry within a removable storage medium which may be utilized to implement the method and system of the present invention.

DETAILED DESCRIPTION OF PREFERRED EMBODIMENT

Figure 1:
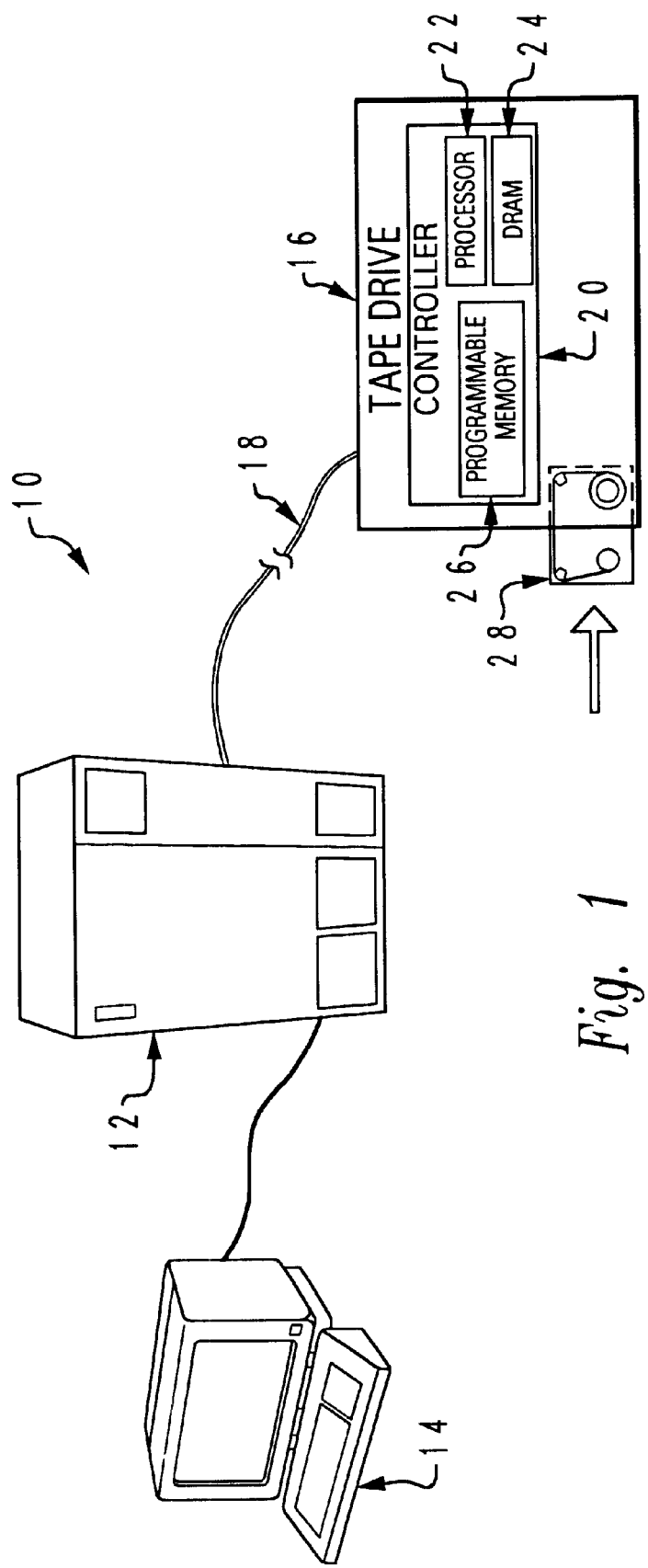
FIG. 1 is a pictorial and high level block diagram of one data processing system which may be utilized to implement the method and system of the present invention.

With reference now to the figures and in particular with reference to FIG. 1, there is depicted a pictorial and high level block diagram of a data processing system 10 which may be utilized to implement the method and system of the present invention. As illustrated, data processing system 10, in the depicted embodiment, includes a host computer 12. Host computer 12 may be implemented utilizing any suitable computer, such as International Business Machines Corporation AS/400, or may be implemented utilizing any other suitable computer. A terminal 14 is coupled to host computer 12 and may be utilized by an operator thereof to input data to and receive data from host computer 12.

In the depicted embodiment of data processing system 10, a tape drive 16 is coupled to host computer 12 via channel 18. Channel 18 comprises any suitable channel for interconnecting devices, such as tape drive 16 and host computer 12, such as the Small Computer Systems Interface (SCSI).

As illustrated, tape drive 16 preferably includes a controller 20 which, as is common in such devices, includes a processor 22, dynamic random access memory (DRAM) 24 and a section of programmable memory 26. In the depicted embodiment of the present invention programmable memory 26 may comprise so-called "flash" memory or other suitable electrically alterable programmable read only memory which may be utilized to store microcode, basic input/output system code (BIOS) or other software applications which are suitable for retention in such memory.

Also illustrated within FIG. 1 is a magnetic tape cartridge 28 which contains a quantity of magnetic recording tape utilized for storing large amounts of data within such data processing systems. In the depicted embodiment of the present invention, a specialized magnetic tape cartridge containing installation software will be referred to throughout the present specification as an "installation cartridge." As depicted within FIG. 1, magnetic tape cartridge 28 may be inserted within tape drive 16 and utilized to store and retrieve data within data processing system 10. Although a magnetic tape cartridge is depicted, those having skill in the art will appreciate that any storage system utilizing removable storage media may be utilized to implement the method and system of the present invention. Examples of other such systems include magnetic disk storage systems, optical disk storage systems and reel-to-reel magnetic tape storage systems.

In accordance with the method and system of the present invention an installation cartridge of the type illustrated at reference numeral 28 may be inserted within tape drive 16 and utilized to install an alternate version of a software application within data processing system 10. In the depicted embodiment an installation cartridge is utilized to update the microcode within programmable memory 26, in a manner such that the previous version of the microcode is automatically saved within magnetic tape cartridge 28, to permit the installation of an alternate version of the microcode to be reversed in the future. However, the method and system of the present invention may be applicable to installation of operating systems or other high level software applications.

Referring now to FIG. 2, there is depicted a pictorial representation of a directory entry within a removable storage medium which may be utilized to implement the method and system of the present invention. As illustrated, a microcode replacement directory 40 is depicted. The information contained within this directory is preferably stored within magnetic tape cartridge 28 (see FIG. 1) and updated each time an alternate version of microcode is installed or removed from a tape drive within a selected enterprise. As depicted, microcode replacement directory 40 includes multiple columns containing selected information with respect to the various alternate versions of microcode which are available and which have been installed.

For example, column 42 includes an offset to the next entry within the directory. For purposes of illustration the actual offset to a next entry is not listed. Next, column 44 identifies the engineering change level associated with each particular microcode level. As illustrated, three separate levels of microcode are contained within magnetic tape cartridge 28, level 1B, level 2D and level 5L.

Next, columns 46 and 48 list the minimum and maximum hardware levels required for tape drive 16 to utilize a particular engineering change level of the microcode. Those having ordinary skill in the art will appreciate that the installation of operating systems, or high level software applications, may also carry with it requirements for minimum and maximum hardware level for support of those applications and that this information is particularly useful for updating or installing software applications. Column 50 identifies the location of each level of microcode within magnetic tape cartridge 28. As those having skill in this art will appreciate, elements within a magnetic tape cartridge are typically stored as data blocks and the data block number for each level of microcode is identified within column 50.

Next, column 52 identifies the length of each level of microcode and column 54 identifies the number of tape drives within a particular enterprise which have utilized each level of microcode within microcode replacement directory 40. Finally, column 56 lists each tape drive within an enterprise which either currently or has previously utilized a particular microcode level.

In accordance with an important feature of the present invention, and as will be explained in greater detail herein, each time the level of microcode within a tape drive associated with a data processing system is altered, a microcode replacement directory is created which reflects the state of data following that alteration. In this manner, the installation of an enhanced or alternate microcode level may be selectively reversed or reinstalled without the necessity of creating and cataloging backup copies of each microcode package. By automatically copying existing microcode levels from a tape drive prior to permitting initiation of installation of an alternate version of the microcode, the method and system of the present invention permits the selective reversibility of such installations and provide an efficient manner to catalog multiple software application versions within a single enterprise.

Figure 3:
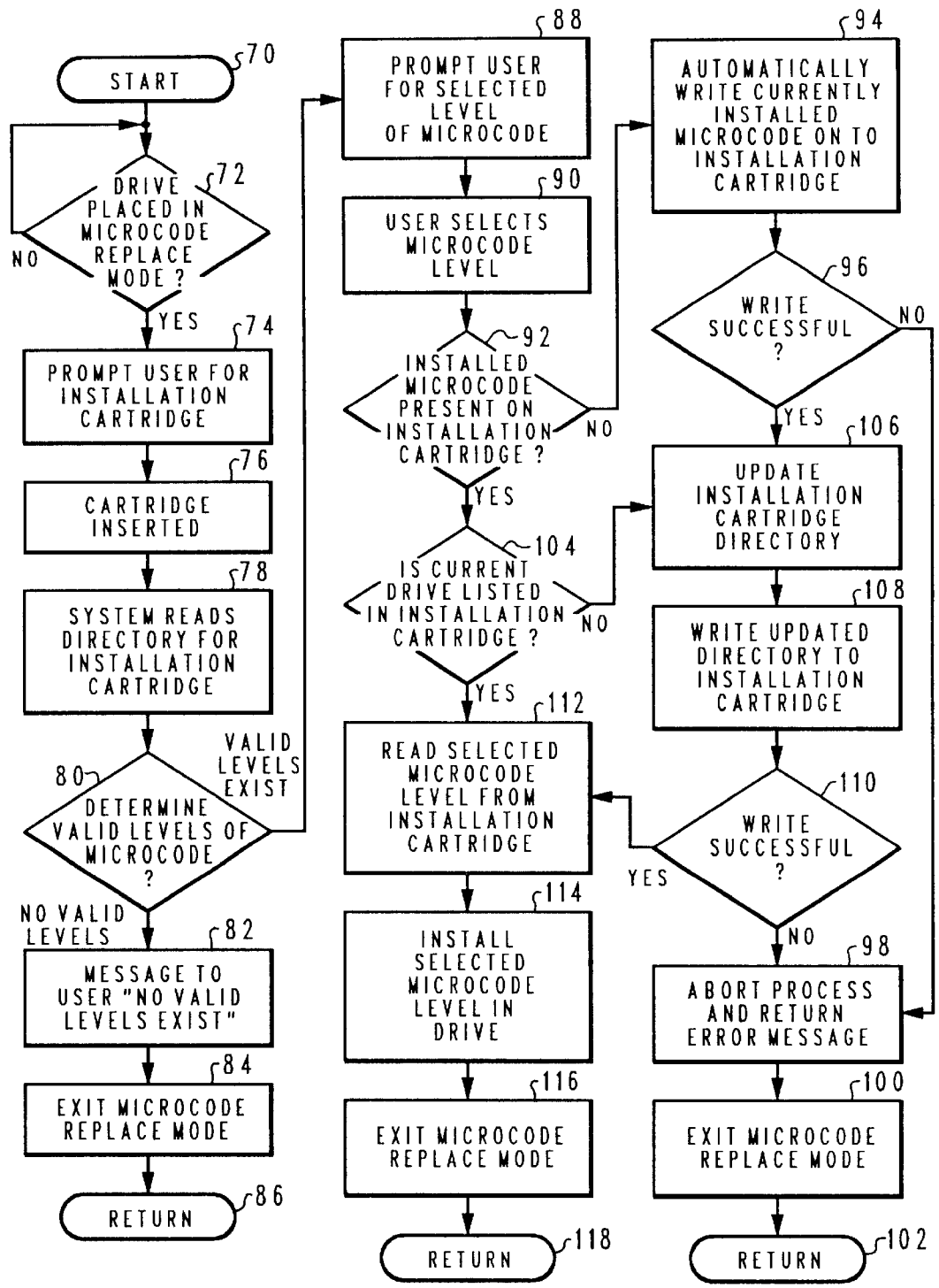
FIG. 3 is a high level logic flowchart which illustrates the method for reversible installation of a software application within a data processing system in accordance with the present invention.

With reference now to FIG. 3, there is depicted a high level logic flowchart which illustrates the method for reversible installation of a software application within a data processing system in accordance with the present invention. As depicted, the process begins at block 70 and thereafter passes to block 72. Block 72 illustrates a determination of whether or not a particular tape drive has been placed in the microcode replace mode. If not, this process merely iterates until such time as this event occurs.

Still referring to block 72, in the event a tape drive has been placed in the microcode replace mode the process passes to block 74. Block 74 illustrates the prompting of the user for the installation cartridge. As described above, the installation cartridge is a magnetic tape cartridge which includes the various levels of microcode utilized by a particular enterprise. Next, block 76 illustrates the insertion of the magnetic tape cartridge containing the installation data and the process then passes to block 78.

Block 78 illustrates the reading of the directory within the installation cartridge and the process then passes to block 80. Block 80 depicts a determination of whether or not valid levels of microcode exist within the installation cartridge for the particular tape drive in question. As described above, particular levels of microcode may require minimum and maximum hardware configuration levels and it is possible that a particular tape drive may not possess the hardware level required to support those microcode levels within the installation cartridge. If no valid levels of microcode are present within the installation cartridge, the process passes to block 82 which depicts the presentation of a message to the user that no valid levels of microcode exist within this installation cartridge. Thereafter, the process passes to block 84 which illustrates the exiting of the tape drive from the microcode replace mode and the process then returns, as depicted at block 86.

Still referring to block 80, in the event valid levels of microcode exist within the installation cartridge, the process passes to block 88. Block 88 illustrates the prompting of the user for a selected level of microcode. Of course, there may be multiple levels of microcode within a single installation cartridge which are all appropriate for a particular tape drive. Next, the process passes to block 90 which depicts the selection by the user of a desired microcode level.

Next, in accordance with an important feature of the present invention, the process passes to block 92 which illustrates a determination of whether or not the currently installed microcode within the tape drive is present on the installation cartridge. If not, the process passes to block 94 which illustrates the automatic writing of the currently installed microcode onto the installation cartridge. By automatically creating a copy of the currently installed microcode on the installation cartridge prior to initiating installation of an alternate microcode level the installation of that alternate microcode level may be selectively reversed utilizing the copy of the previous microcode which is automatically written to the installation cartridge.

Thereafter, the process passes to block 96. Block 96 illustrates a determination of whether or not the copying of the installed microcode to the installation cartridge was successful. If not, the process passes to block 98 which illustrates the aborting of the process and the returning of an error message to the user indicating that an alternate microcode level may not be installed due to the inability of the system to copy the currently installed microcode onto the installation cartridge. Next, the process passes to block 100 which illustrates the exiting of the drive from the microcode replace mode and the process then passes to block 102 and returns.

Referring again to block 92, in the event the currently installed microcode version is present on the installation cartridge, the process passes to block 104. Block 104 illustrates a determination of whether or not the current tape drive is listed within the installation cartridge as a user of that microcode level. If not, or after automatically copying the currently installed microcode level to the installation cartridge, as depicted at block 94, the process passes to block 106. Block 106 illustrates the updating of the installation cartridge directory, as illustrated at FIG. 2. The installation cartridge directory is then updated to show the current tape drive as a listed user for the presently installed microcode or, to show that current tape drive listed as a user of the previously installed level of microcode after copying that level of microcode to the installation cartridge.

After updating the installation cartridge directory the process passes to block 108 which illustrate the writing of the updated directory to the installation cartridge. Next, the process passes to block 110 which illustrates a determination of whether or not the writing of the updated directory to the installation cartridge was successful. If not, the process again passes to block 98 which illustrates the aborting of the process and the returning of an error message to the user indicating that the installation of an alternate microcode level was not possible due to the inability of the system to write the updated directory to the installation cartridge. As described above, the process then passes to block 100 which depicts the exiting of the tape drive from the microcode replace mode and the process then passes to block 102 and returns.

After successfully writing the updated directory to the installation cartridge, or in the event the current tape drive is listed within the installation cartridge as a user of the currently installed microcode level, the process passes to block 112. Block 112 illustrates the reading of the selected microcode level from the installation cartridge. Next, the process passes to block 114. Block 114 illustrates the installing of the selected microcode level within the tape drive and the process then passes to block 116. Block 116 depicts the exiting of the tape drive from the microcode replace mode and the process then returns, as depicted at block 118.

Upon reference to the foregoing those skilled in the art will appreciate that the method and system of the present invention provides a technique for reversibly installing a software application within a data processing system by implementing an automated archival process wherein an attempted installation of an alternate version of a software application will not be initiated until such time as it is determined whether or not the currently installed software application within the data processing system has been copied to an installation cartridge. After copying the currently installed software application to an installation cartridge the initiation of the installation of an alternate version of that software is permitted and a directory is updated such that the installation may be selectively reversed or repeated in the event that such action is necessary.

While the invention has been particularly shown and described with reference to a preferred embodiment, it will be understood by those skilled in the art that various changes in form and detail may be made therein without departing from the spirit and scope of the invention.

What is claimed is:

1. A method for reversibly installing a software application within a data processing system among a plurality of data processing systems, said data processing system having a processor, memory containing a first version of a selected software application and a storage system for receiving a removable storage medium, said method comprising the steps of:

inserting said removable storage medium containing at least one alternate version of said selected software application within said storage system;

prompting a user of said data processing system to select an alternate version of said selected software application for installation within said data processing system utilizing said storage system;

automatically copying said first version of said selected software application from said memory onto said removable storage medium prior to initiation of installation of an alternate version of said selected software application in response to said selection thereof wherein said installation may be selectively reversed; and creating a directory within said removable storage medium listing each alternate version of said selected software application contained therein and a unique identification of each data processing system among said plurality of data processing systems which has utilized each of said alternate versions of said selected software application.

2. The method according to claim 1, further including the step of listing within said directory within said removable storage medium an identification of said first version of said selected software application in response to copying thereof.

3. The method according to claim 2, further including the step of listing within said directory a minimum and maximum hardware configuration required for each alternate version of said selected software application contained therein.

4. The method according to claim 1, further including the step of listing within said directory an address location within said removable storage medium for said alternate version of said selected software application contained therein.

5. The method according to claim 1, further including the step of listing within said directory a length of each alternate version of said selected software application contained therein.

6. An enterprise including a plurality of data processing systems, each data processing system comprising:

a processor;

memory coupled to said processor for containing a first version of said selected software applications;

a storage system coupled to said processor for receiving a removable storage medium;

a removable storage medium adapted to mount within said storage system, said removable storage medium containing at least one alternate version of said selected software application;

prompting means for prompting a user of said data processing system to select an alternate version of said selected software application for installation within said data processing system; and storage system control means for automatically copying said first version of said selected software application from said memory onto said removable storage medium prior to initiation of installation of an alternate version of said selected software application in response to selection thereof and for creating a directory within said removable storage medium listing each alternate version of said selected software application contained therein and a unique identification of each data processing system among said plurality of data processing systems within said enterprise which has utilized each of said alternate versions of said selected software application wherein said installation may be selectively reversed.

7. The data processing system according to claim 6, wherein said selected software application comprises microcode and wherein said memory comprises programmable read only memory.

8. The data processing system according to claim 6, wherein said storage system comprises a cartridge tape drive.

9. The data processing system according to claim 8, wherein said removable storage medium comprises a magnetic tape cartridge.

10. The data processing system for permitting the reversible installation of a software application therein according to claim 6, wherein said storage system control means further includes means for creating a directory within said removable storage medium listing each alternate version of said selected software application contained therein.

\* \* \* \* \*